United States Patent [19]

Callahan

[11] 4,395,924
[45] Aug. 2, 1983

[54] FLEXIBLE ROTARY TO LINEAR AND NON-LINEAR DRIVE MECHANISM

[75] Inventor: John W. Callahan, Peapack, N.J.

[73] Assignee: Pennwalt Corporation, Philadelphia, Pa.

[21] Appl. No.: 320,988

[22] Filed: Nov. 13, 1981

[51] Int. Cl.³ .......................... F16H 1/20; F16C 1/10
[52] U.S. Cl. ............................ 74/424.8 R; 74/501 R
[58] Field of Search .................. 74/424.8 R, 501; 411/411, 412, 378; 57/212, 260, 207, 219

[56] References Cited

U.S. PATENT DOCUMENTS

| | | | |
|---|---|---|---|
| 2,716,352 | 8/1955 | Wilson | 74/424.8 R |
| 3,184,986 | 5/1965 | Kompanek | 74/501 |
| 3,798,984 | 3/1974 | McMinn | 74/89.15 |
| 3,824,420 | 7/1974 | Stegman et al. | 310/89 |
| 4,227,426 | 10/1980 | Schwanz | 74/424.8 |

FOREIGN PATENT DOCUMENTS 712235 10/1941 Fed. Rep. of Germany .

OTHER PUBLICATIONS

IBM Technical Disclosure Bulletin, vol. 15, No. 4, Sep. 72, C. Yakubowski.

*Primary Examiner*—Lawrence J. Staab
*Assistant Examiner*—Michael D. Bednarek

[57] ABSTRACT

A flexible shaft has its outermost layer of windings provided with a helical gap along length of the shaft. The helical gap is formed by a flexible shaft winding machine which is programmed to uniformly intermittently discontinue coiling the windings very closely in the outermost layer to thereby uniformly leave a continuous helical space along the shaft length which forms the helical gap. A smooth-bore nut has a pair of transversely disposed pins or screws extending partially thereinto for engaging the helical gap to cause the nut to travel along an unlimited length of a rotating flexible shaft which may be curved. The pins or screws are spaced to ride in the helical gap a pitch distance apart.

4 Claims, 2 Drawing Figures

FLEXIBLE ROTARY TO LINEAR AND NON-LINEAR DRIVE MECHANISM

STATEMENT OF THE INVENTION

This invention relates to a flexible rotary to linear and non-linear drive mechanism and more particularly to such a mechanism which employs a rotatable flexible shaft as the flexible member.

BACKGROUND AND SUMMARY OF THE INVENTION

Rotary to linear drive mechanisms are known. In each, a threaded nut or the like is adapted to be translated back and forth, or up and down, relative to a screw member which rotates. The nut may be adapted to lift car windows and antennas, to remotely actuate building windows and engine controls, and, in short, wherever it is desirable and feasible to effect linear motion of a member from rotary motion of another member.

Non-flexible rotary to linear drive mechanisms are often roller-type or ball-type and frequently include ball screw cylinders employing various types and configurations of non-flexible screw members, or other type nut and screw devices requiring complicated components.

Prior art flexible rotary to linear drive devices generally employ a separate wire coiled helically about a flexible core. Such devices tend to be difficult to fabricate and often require many special parts.

The present invention employs a conventional rotatable flexible shaft except for its outermost layer of coiled windings. Thus, the machine for winding the respective layers of windings is adapted to wind the outermost layer, not continuously closely coiled as in the layer or layers of windings underneath the outermost layer, but in an identical series of continuously closely coiled windings, each adjacent series thereof having a gap therebetween formed by an absence of windings, the gaps thus forming a continuous helical path along the length of the flexible shaft. The depth of the helical gap is substantially equivalent to the diameter of the wire used for the outermost layer of windings. The width of the helical gap is determined by the number of absent or missing coils or turns of windings between the series of continuously coiled windings. The pitch of the gap is controlled by the number of windings in any of the closely coiled series of windings.

The smooth-bored nut which travels along the helical gap is provided with a pair of spaced pins extending into the smooth bore and engaging the helical gap at two points therealong defined by its pitch. Upon rotation of the shaft, the nut will be routed therealong, even though the shaft is curved or tortuously disposed and of virtually unlimited length.

The present device is simple and inexpensive to fabricate.

DETAILED DESCRIPTION OF THE INVENTION

Figure 1:
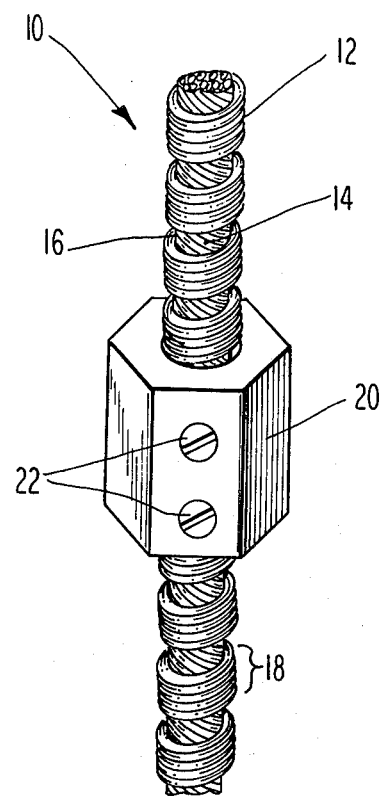
FIG. 1 is a perspective view of the flexible rotary to linear and non-linear drive mechanism of the present invention.

Referring to the drawings, except for its outermost layer of windings, a conventional rotatable flexible shaft 10 comprises a plurality of coils of closely wound wire having a first layer thereof wound directly onto a straight wire core mandrel, with additional layers coiled successively one upon another, in alternate opposing directions, i.e., left lay and right lay.

Outermost layer 12 is wound with an opposite lay to the layer 14 directly thereunder. Outermost layer 12 is characterized by a helical gap 16 of specific width and specific pitch.

Layer 14, and those underneath, if any, are wound over the mandrel by a winding machine in accordance with manufacturing techniques known in the industry. The winding machine, however, is designed or programmed to wind outermost layer 12 with a gap 16 of specific width after each series of closely wound coils 18. The slope of gap 16 necessarily follows the slope of the windings of the outermost layer. The desired width and pitch of gap 16 may readily be controlled by respectively programming the number of windings absent between adjacent coils 18 and the number of windings present in each of coils 18.

Figure 2:
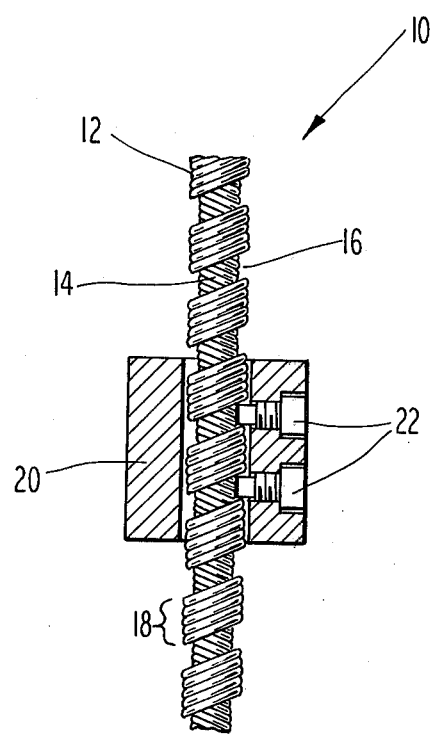
FIG. 2 is an axial sectional view of the mechanism illustrated in FIG. 1.

Nut 20, suitably of aluminum and hexagonal as illustrated, although not limited to either, is smooth-bored and provided with a pair of threaded orifices for receiving screws 22, conveniently Allen-type screws. As shown clearly in FIG. 2, screws 22 are disposed transversely the smooth bore of nut 20. Screws 22 are spaced from each other and of such a diameter that each inner end thereof rides in the continuous helical gap 16 on an opposite side of a coil 18, or along a pitch distance.

The nut is not intended to be limited to a pair of pins or screws engaging the gap along its pitch or on opposing sides of one series of coils 18. Thus, a single pin or screw, or more than two may be employed, and the pins or screws may be spaced to engage the gap along non-adjacent series of coils 18.

The present rotary to linear and non-linear drive mechanism is useful in raising and lowering automobile windows and antennas, for example; in remotely controlling engines and inaccessible components; and the like. Since the flexible shaft may be of unlimited length and routed in a curved or tortuous path, the present device may be used in almost any application where rigid actuators are currently used as well as additional applications where it is desirable to convert rotaty motion to a motion which is linear or follows the curvature of the rotating flexible shaft.

I claim:

1. Apparatus for converting rotary motion of a conventional rotatable flexible shaft to linear and non-linear motion of a nut coacting therewith comprising
    a conventional rotatable flexible shaft including a wire mandrel having a plurality of layers of closely coiled wire wound succesively thereover, each of said layers having an opposing lay to the layer directly underneath, outermost layer of wires forming a series of uniformly spaced closely coiled windings, each of said spaced series being separated from an adjacent series by a space forming a continuous helical gap along said flexible shaft, said flexible shaft being devoid of a single wire helix-forming member, said nut having a smooth bore for travelling along said flexible shaft, said nut having pin means adjustably mounted thereto for continuously engaging said continuous helical gap whereby rotary motion imparted to said flexible shaft causes said nut to travel linearly when said flexible shaft is linearly disposed and non-linearly when said flexible shaft is non-linearly disposed.

2. Apparatus of claim 1 wherein said pin means partially penetrates said smooth bore and extends normally thereinto.

3. Apparatus of claim 2 wherein said pin means comprises a pair of spaced threaded Allen screws, said screws each having an inner end engaging said helical gap at different points along a longitudinal axis of said flexible shaft, said points being defined by any two adjacent series of said closely coiled windings.

4. Apparatus of claim 3 wherein inner ends of said screws engage said helical gap at pitch points thereon.

* * * * *